United States Patent [19]

Gersbach

[11] 3,863,229

[45] Jan. 28, 1975

[54] SCR (OR SCS) MEMORY ARRAY WITH INTERNAL AND EXTERNAL LOAD RESISTORS

[75] Inventor: John Edwin Gersbach, Burlington, Vt.

[73] Assignee: International Business Machines Corporation, Armonk, N.Y.

[22] Filed: June 25, 1973

[21] Appl. No.: 373,047

[52] U.S. Cl. ............ 340/173 FF, 307/284, 307/291

[51] Int. Cl. .......................... G11c 11/40, G11c 5/00

[58] Field of Search ....... 340/173 FF; 307/238, 284, 307/291, 305

[56] References Cited

UNITED STATES PATENTS

| | | | |
|---|---|---|---|
| 3,603,820 | 9/1971 | Schuenemann | 340/173 FF |
| 3,623,029 | 11/1971 | Davidson | 340/173 FF |

OTHER PUBLICATIONS

Jutzi, et al., Cross-Coupled Thyristor Storage Cell, IBM J. Res. Develop, Vol. 16, No. 1, 1/72, pp. 35–44, S2679–0139.

Schuenemann, Three-State Associative Cross-Coupled SCR Cell, IBM Technical Disclosure Bulletin, Vol. 14, No. 8 1/72, pp. 2505–2506.

Bleher et al., Accessing Circuit for Memory Cell, IBM Technical Disclosure Bulletin, Vol. 14, No. 9, 2/72, pp. 2821–2822, S0756 0230.

*Primary Examiner*—Stuart N. Hecker
*Attorney, Agent, or Firm*—William J. Dick

[57] ABSTRACT

A memory cell organization including an array of integrated circuit memory cells arranged in rows and columns, each of the cells comprising a pair of cross-coupled PNPN switching devices, (silicon controlled rectifiers) to form a bistable data storage cell. Each of the cells of the array includes a load terminal, a pair of gating terminals and a common node terminal, the gating terminals being connected to the bit select lines associated with each column of cells, while the common node terminal is connected to a word line associated with each row of cells. A source of power is provided having at least two terminals, and a resistor is connected to one of the terminals external of the integrated circuit cells, the resistor having a common terminal which is connected to a plurality of the cells of each word line to thereby provide a source of voltage for the cells. The common node terminal of a row of cells is connected to the second terminal of the source of power which provides standby current for the cells.

8 Claims, 2 Drawing Figures

SCR (OR SCS) MEMORY ARRAY WITH INTERNAL AND EXTERNAL LOAD RESISTORS

SUMMARY OF THE INVENTION AND STATE OF THE PRIOR ART

Figure 1:
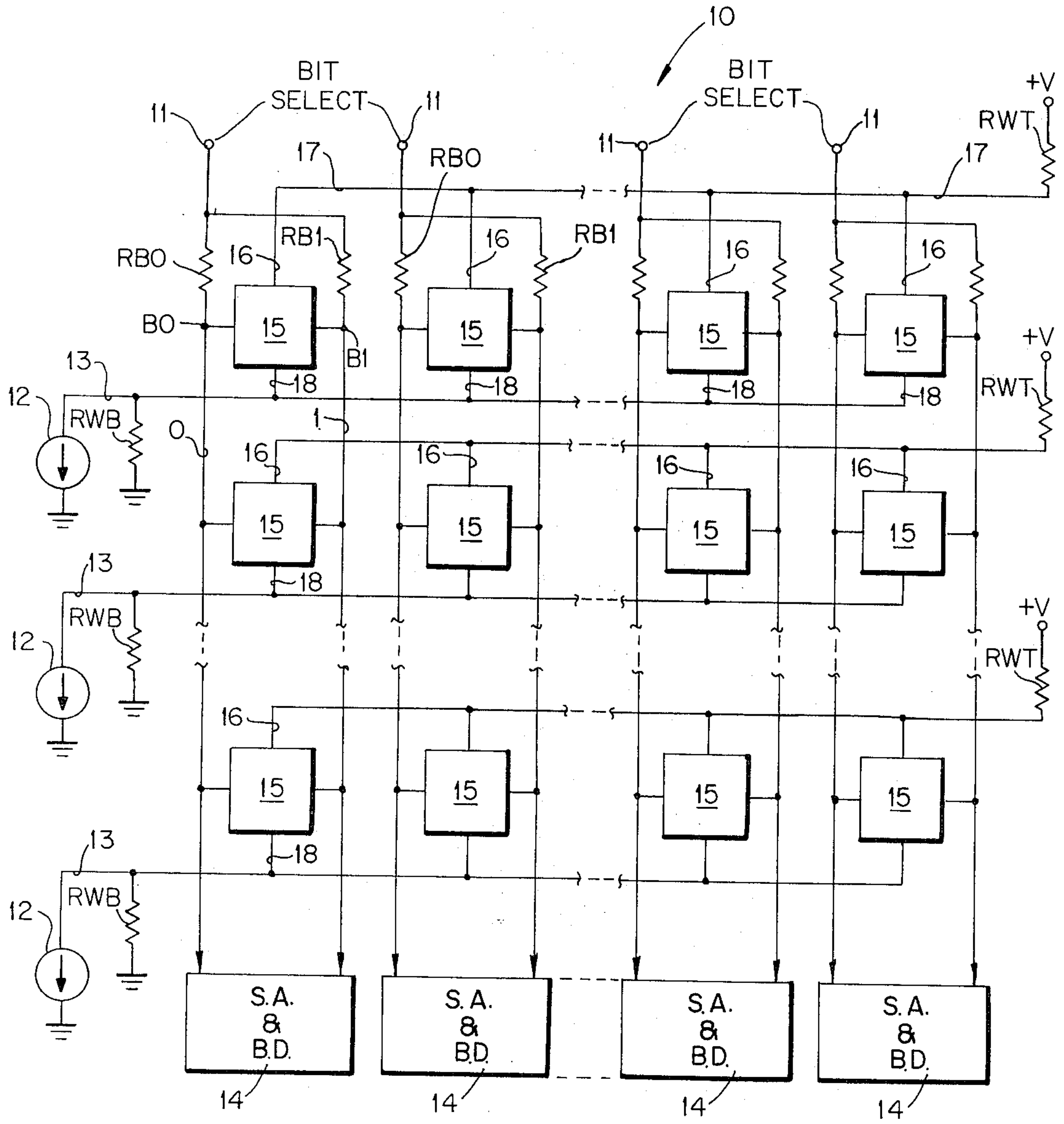

The present invention relates to a data storage memory cell array, and more specifically relates to a data storage memory cell organization in which the cells are comprised of cross-coupled, bistable PNPN devices.

Conventionally, a silicon controlled rectifier is a PNPN structure with three of the semiconductor regions accessible. After the introduction of the silicon controlled rectifier, it became evident that it would be desirable to permit access to all four semiconductor regions rather than only three. The device thus formed became known as a silicon controlled switch (SCS) rather than a silicon controlled rectifier (SCR). However, inasmuch as the first device was the SCR, the latter device has still become loosely referred to as an SCR and is still referred to, in today's technology, as a silicon controlled rectifier. Accordingly, hereinafter even though the structure of the particular cell is referred to as an SCR, it should be recognized that the cell is in effect comprised of a pair of silicon controlled switches, or PNPN devices.

The SCR or PNPN device is important because it behaves like a pair of complementary transistors in a regenerative feedback configuration. There have been numerous attempts at construction of data storage or memory cells utilizing SCR's to take advantage of their high triggering sensitivity. The practicality of this cell, however, has been less than what it should be because of the higher load resistance integrated into the cell as opposed to a load resistor common to a plurality of cells, resulting in high heat and power losses. Additionally, the cells themselves have been difficult to write into i.e., to change the state of because of the tendency for the high frequency portion (the NPN portion) of the SCR to conduct more heavily and be driven into saturation.

In view of the above, it is a principal object of the present invention to provide a memory cell array and organization composed of PNPN devices, (silicon controlled rectifiers), each cell of the storage array being composed of a pair of SCRs which are directly cross-coupled to form a bi-stable latch type storage cell.

Another object of the present invention is to arrange the memory cell array so that optimum numbers of cells may be employed on a minimum of silicon area.

Yet another object of the present invention is to provide an array of integrated circuit memory cells comprised of cross-coupled silicon controlled rectifiers having minimum power dissipation in the cell for both maintaining the stored data and for writing into the cell.

Yet another object of the present invention is to provide a novel manner of powering the cells so that the tendency for the cell to enter the negative resistance region will be minimized.

Yet another object of the present invention is to provide a memory storage array in which the individual cells are directly cross-coupled silicon controlled rectifiers forming a bistable latch and in which means are provided for preventing the SCRs of the cell from entering into the saturated state whereby writing into the cell is difficult.

Another object of the present invention is to provide a directly cross-coupled silicon controlled rectifier cell which is bistable in which the cell design is optimized with its voltage source so as to make it easier to write into the cell while employing a low dissipation, low value resistor intermediate the voltage source and the silicon controlled rectifiers.

Another object of the present invention is to provide a linear impedance means in the cross-coupled semiconductor rectifier cell which insures current sharing between adjacent cells on a word line.

Figure 2:
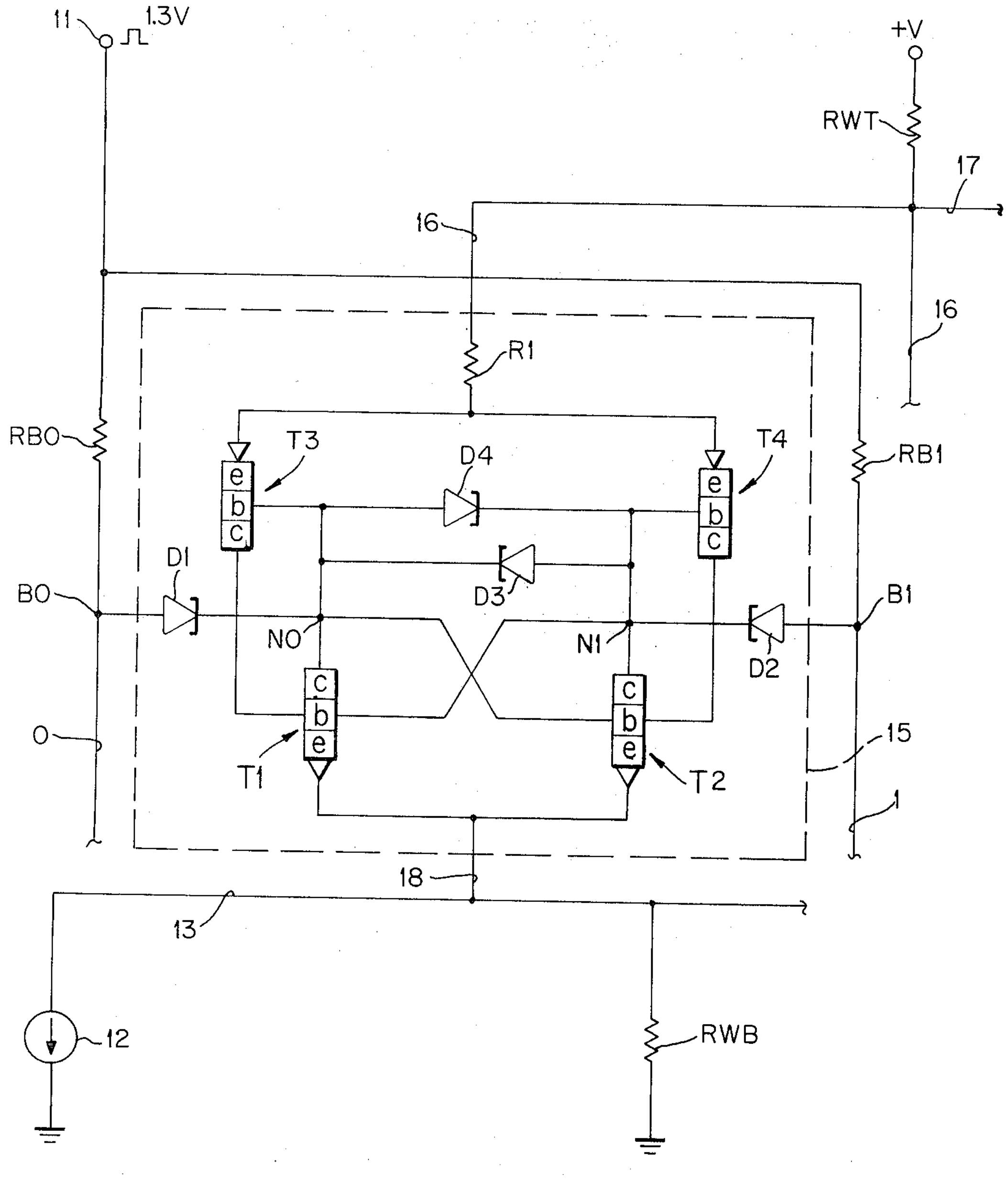

Other objects and a more complete understanding of the invention may be had by referring to the following specification and claims taken in conjunction with accompanying drawings in which:

FIG. 1 is a schematic representation of a memory cell organization constructed in accordance with the present invention; and FIG. 2 is a fragmentary schematic view of a typical cross-coupled silicon controlled rectifier cell utilized in the memory cell organization of the present invention.

Referring now to the drawings, and particularly FIG. 1 thereof, a memory organization 10 comprised of an array of integrated circuit memory cells 15 is illustrated therein. As shown, the cells 15 are arranged in horizontal rows and vertical columns, each cell including a load terminal 16, which is connected to a voltage source or word top bus 17, a pair of gating terminals B0 and B1 and a common node terminal 18. As is conventional, the gating terminals B0 and B1 of each column of cells are connected to bit select lines 0 and 1, the bit select lines extending vertically and connected to bit select drive resistors RBO and RB1 respectively which are connected as to a driving source at 11. Connecting each of the common nodes of a row of cells 15 is a word driver 12 which is connected to a word line 13 to pulse the line negative, in a manner which will be more fully explained hereinafter. As is typical, sense amplifiers and bit drivers 14 are connected to the bit sense lines 0 and 1 and perform in a conventional well known manner. Thus any particular cell in any column of cells may be selected by pulsing the bit select lines by a source 11 and by pulsing the word line 13 by a particular word driver 12 in a predetermined row.

For reasons which will be more completely explained hereinafter, the voltage bus line 17 is connected through a first single impedance means, in the present instance a resistor RWT to a source of power having a first terminal, in the illustrated instance at +V volts, and a second terminal, as illustrated ground or common.

In accordance with the invention, the cells 15 are comprised of PNPN devices which are referred to hereinafter as silicon controlled rectifiers (SCR's) having four terminals. To this end, and referring now to FIG. 2, each SCR of a pair is illustrated in its behavioral mode, that is as two complementary transistors in a regenerative feedback configuration. Thus transistors T1 and T3 are one PNPN or silicon controlled rectifier device and transistors T2 and T4 are the other device, the devices being referred to hereinafter in their behavioral configuration. As shown, transistors T1 and T2 are of a first conductive type (NPN) while transistors T3 and T4 are of a second conductive type (PNP). Each of the transistors of a like conductivity are directly cross-coupled and the transistors T3 and T4 are, in a like manner directly cross-coupled. In the configuration shown, the collector of T3 is joined to the collector of T2, while the collector of T4 is joined to the collector of T1, the collector of T4 and T1 joining at node NO while the collectors of T2 and T3 join at the node N1. As illustrated, the emitters of T1 and T2 are connected to the word line 13 while the emitters of T3 and T4 are connected to second impedance means, in the present instance a resistor R1 which couples the emitters through the load terminal 16 to the voltage source or bus 17. A single resistor RWB is provided intermediate the word lines in the second terminal of the power source, in the present instance ground to maintain the emitters of T1 and T2 at a predetermined voltage level as determined between the voltage bus 17 and the common word line 13.

In order to read the contents of the cell and write to change the data stored therein, gating means are provided to the nodes N0 and N1 and are connected intermediate the gating terminals B0 and B1. To this end, and as illustrated in FIG. 2, the gating means comprises diodes D1 and D2 respectively, in the present instance the diodes, for ease of fabrication and speed, Schottky diodes. Additionally, to prevent saturation and limit the current through transistors T1 and T2 by clamping the base collector junctions of those transistors, Schottky diodes D3 and D4 are provided, in the illustrated instance the collector base junctions of T2 and T1 respectively, and the base collector junctions of T4 and T3 respectively inasmuch as they are the same respective junctions.

The reading of individual cells is accomplished as follows: first the bit sense lines 0 and 1 are pulsed by a positive pulse of less than +V volts, for example 1.3 volts. (With the example given, +V volts would be on the order of 2.5 volts.) The word driver 12 associated with a particular row of cells 15 is then pulsed negative increasing the voltage from bus 17 to the word line 13. Assuming that T1 and T3 are conducting, the pulsing of the word line negative by the word driver 12 will tend to increase conduction of these transistors. An increase in conduction tends to effect a decrease in voltage at the collector of T1 increasing the voltage drop across resistor RB0 and causing the voltage at the gating terminal B0 to decrease. The positive pulse on the anode of diode D2 tends to increase the collector voltage of transistor T2 (which is cut off) and therefore increase the base voltage of transistor T1 tending to increase conduction in transistor T1. However, inasmuch as the current flow through diode D2 is less than the current flow through diode D1, there is less current flowing through resistor RB1 and therefore the voltage at gating terminal B1 is higher than at B0. The sense amplifier 14 will therefore record the differential voltage between the gating terminals B1 and B0 and indicate, thereby, the stored state of the cell.

The writing of a particular cell 15, to effect a change in state thereof, occurs as follows: assume that T1 and T3 are conducting and it is desired to change the differential voltage across gating terminals B1 and B0. The bit driver 14 will first clamp the gating terminal B1 at 0 volts. Inasmuch as the anode of diode D2 is set at 0 volts no current will flow through that diode. The bit lines are then pulsed in a manner such as heretofore described, that is with less than +V volts, and simultaneously the word line is pulsed negative increasing the conduction through the silicon controlled rectifier comprised of transistors T1 and T3. Because of the current flow through diode D1, the voltage at the base of transistor T2 is raised and the base of transistor T3 increases in potential. As T2 starts conducting it lowers its collector voltage causing the voltage at the base of transistor T1 to become more negative thereby causing T4 to start conduction and T1 to stop conduction. The collector voltage of T1, in this manner raises, and the base of transistor T3 goes up (more positive) thereby cutting off transistor T3.

With the cross-coupled silicon controlled rectifier cell which forms a bistable data storage cell, there is essentially no lower limit on the standby current required to retain the data in the cell, except that such lower limit be at least two or three times the leakage current flowing into node N0 or N1. Thus the standby or data retention current through the cell can be very low while still allowing a relatively small physical size cell. The other advantage of this type of cell is that the low frequency paths which are the transistors T3 and T4 are in parallel with the delay path through the cell so that they do not degrade the performance of the cell. Additionally, the low frequency transistors, T3 and T4, act as the loads for transistors T1 and T2.

Additionally, with the structure of the memory organization and cell as shown, in previous silicon control rectifier type memory cells the resistor R1 was taken directly into a +V volts which made it difficult to write into the cell through diodes. As set forth above in the example of how to write into the cell, with transistors T1 and T3 conducting and it is desired to switch the cell, the current coming in through diode D1 must overcome transistor T1's collector current before transistor T2 can turn on. Transistor T1's collector current is determined by the voltage along the bus or voltage source line 17. Since there are a large number of cells in any one row, all of the half selected cells (being half selected by the negative pulse on the word line 13) would hold the voltage on 17 at some constant value between the bus 17 and the word line 13. Therefore the current in transistor T1 is fairly well defined and is of a low value. Thus the clamping action of the other cells along the word line determine what the voltage will be from the bus 17 to the word line 13, more so than the cell that is selected. Thus if each cell were powered directly from a positive voltage source such as the +V to the resistor RWT, then in pulling down on the word line 13, that is turning on the word driver, would effect a large current increase in transistors T1 and T3 making writing into the cell far more difficult. Thus it is essential that a common resistor RWT be provided to set the voltage level along the bus or voltage source line 17. Absent the common resistor RWT, R1 would of necessity be the number of cells in a row times the value of RWT. By the technique shown, R1 may be relatively small (on the order of 2K ohms) and RWT may be relatively small for example 2K ohms. Absent RWT and assuming 64 cells, for example in a single row, the value of R1 would have to be 64 × 2K or 128K ohms which is very difficult to put in a single cell without great power loss and heating of the cell. Thus by R1 being of a small value or a low value the resistor may be placed effectively in the cell with low power dissipation and low heating saving on silicon area and limiting current flow.

Thus R1 is necessary to guarantee the current sharing between the cells on the word line. Additionally, one other important characteristic of the resistor R1 is that in silicon controlled rectifier cells which are cross-coupled to form memory cells, looking at the voltage current characteristics of a silicon controlled rectifier that is on, for example transistors T1 and T3, the on silicon control rectifier will display a characteristic that shows a negative resistance over some range of voltage. The effect is that as voltage decreases across the selected cells the current will actually increase so that at some stable operating point one cell will be taking all of the available current leaving very little or no current for the remaining cells of the row. In effect, resistor R1 then serves to swamp out the negative resistance effect.

The resistor from the word line 13 to the second terminal or ground, and designated RWB for each row of cells, merely helps determine the standby current while maintaining the voltage at a sufficiently high level so that if the word driver is not on in any particular row, but the bit select has been actuated, the cells not so actuated by a word driver will not be disturbed when their associated bit lines are selected. A typical value for RWB is approximately 2K ohms.

Thus with a memory cell organization as shown, and utilizing cross-coupled bistable SCRs as the memory elements, the standby current of the cells may be extremely low; the access path through the selected cells being in parallel with the low frequency components (transistors T3 and T4) allowing for fast access time; and the writability being enhanced by the common resistor RWT, as well as the swamping of the negative resistance by resistor R1, lends to an optimum structure or memory organization.

Although the invention has been described with a certain degree of particularity, it is understood that the present disclosure has been made only by way of example and that numerous changes in the details of construction, the combination and arrangement of parts, and the method of operation may be made without departing from the spirit and the scope of the invention as hereinafter claimed.

What is claimed is:

1. A memory cell organization including an array of integrated circuit memory cells arranged in rows and columns, each cell comprising a pair of cross-coupled silicon controlled rectifiers to form a bistable data storage cell, each cell including a load terminal, a pair of gating terminals and a common node terminal; at least a pair of bit select lines associated with each column of cells and a word line associated with each row of cells; gating means intermediate each gating terminal of each cell and a bit line of each cell of a column; said word line being connected to said common node terminal of each cell of a row; a source of power having at least two terminals and impedance means connected to one of said terminals external of said integrated circuit cells at said load terminal, and conductive means connecting a plurality of said cells to said impedance means to thereby provide a source of voltage for said cells, and including second impedance means in each cell connected to said load terminal to inhibit negative resistance effects when applying a pulse to said bit select lines and a pulse to said word line, and means connecting the common node terminals to said second terminal.

2. A memory cell organization in accordance with claim 1 wherein said gating means comprises a Schottky diode.

3. A memory cell organization in accordance with claim 1 wherein said impedance means comprises a resistor.

4. A memory cell organization in accordance with claim 3 wherein said second impedance means comprises a resistor.

5. A memory cell organization in accordance with claim 1 wherein said means connecting said common node terminals with said second terminal of said source of power includes an impedance means.

6. A memory cell organization in accordance with claim 5 wherein said impedance means is a single resistor common to said common node of each of said cells and said second terminal of said source of power.

7. A memory organization in accordance with claim 1 wherein each of said silicon controlled rectifiers forms complementary transistors in a regenerative feedback configuration, each of the like conductive transistors being directly cross-coupled, and Schottky diodes across the base collector junction of each of the transistors of at least one conductive type to thereby limit saturation current through said transistors of said one conductive type.

8. A memory organization in accordance with claim 7 wherein said Schottky diodes are across the base collector junctions of each of the transistors.

* * * * *